US 12,447,819 B2

(12) United States Patent
Balaraman et al.

(10) Patent No.: US 12,447,819 B2
(45) Date of Patent: Oct. 21, 2025

(54) BRACKET FOR A ROTATING SHAFT

(71) Applicant: GKN Driveline North America, Inc., Auburn Hills, MI (US)

(72) Inventors: Varadarajan Balaraman, Oxford, MI (US); Arthur J. Ball, Oxford, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 415 days.

(21) Appl. No.: 18/162,676

(22) Filed: Jan. 31, 2023

(65) Prior Publication Data

US 2023/0256817 A1 Aug. 17, 2023

Related U.S. Application Data

(60) Provisional application No. 63/310,226, filed on Feb. 15, 2022.

(51) Int. Cl.
*B60K 17/24* (2006.01)
*F16C 35/063* (2006.01)
*F16M 13/02* (2006.01)

(52) U.S. Cl.
CPC .......... *B60K 17/24* (2013.01); *F16C 35/063* (2013.01); *F16M 13/02* (2013.01)

(58) Field of Classification Search
CPC ....... B60K 17/24; F16C 35/063; F16B 21/186
See application file for complete search history.

(56) References Cited

U.S. PATENT DOCUMENTS

| | | | | |
|---|---|---|---|---|
| 2,227,617 | A * | 1/1941 | Yardley | F16C 35/063 384/585 |
| 4,732,230 | A * | 3/1988 | Sakata | B60K 17/24 180/381 |
| 5,208,981 | A * | 5/1993 | Puzsik | B29C 45/14467 29/898.07 |
| 5,703,796 | A * | 12/1997 | Moradi | B60K 17/24 702/170 |
| 6,568,874 | B1 * | 5/2003 | Sommerfeld | F16B 7/0493 403/321 |
| 6,698,965 | B2 * | 3/2004 | Gornick | F16C 23/00 403/287 |
| 6,997,813 | B2 | 2/2006 | Blumke et al. | |
| 8,186,641 | B2 | 5/2012 | Valovick et al. | |
| 8,616,325 | B1 * | 12/2013 | Mesa | B60K 17/24 180/359 |
| 9,677,605 | B2 * | 6/2017 | Cheon | F16C 27/066 |
| 10,675,972 | B2 * | 6/2020 | McLaughlin | B60K 17/24 |
| 11,541,750 | B2 * | 1/2023 | Rakhe | B60K 17/24 |

(Continued)

*Primary Examiner* — Bradley Duckworth
(74) *Attorney, Agent, or Firm* — Reising Ethington P.C.

(57) ABSTRACT

In at least some implementations, a bracket for a rotating shaft includes a base and a retainer. The base has a mount body and a receiver having a first portion coupled to the mount body, a second portion extending from the first portion at a first end of the second portion to a second end of the second portion, a seat and an opening. The opening is defined at least in part by an inner surface disposed around a center axis. The retainer has a first surface engaged with the seat and a second surface engaged with a retention surface of the mount body and the retainer prevents separation of the seat from the retention surface by a distance greater than the distance between the first surface and the second surface.

24 Claims, 4 Drawing Sheets

(56) References Cited

U.S. PATENT DOCUMENTS

2002/0171012 A1  11/2002  Boutin
2003/0234132 A1  12/2003  Blumke et al.
2003/0236122 A1  12/2003  Blumke et al.
2003/0236123 A1  12/2003  Blumke et al.
2022/0170591 A1* 6/2022  Dube .................... B60K 17/24

* cited by examiner

BRACKET FOR A ROTATING SHAFT

REFERENCE TO RELATED APPLICATIONS

This application claims the benefit of U.S. Provisional Application Ser. No. 63/310,226 filed on Feb. 15, 2022 the entire content of which is incorporated herein by reference in its entirety.

TECHNICAL FIELD

The present disclosure relates generally to a bracket for a rotary shaft such as a vehicle propshaft.

BACKGROUND

Brackets for rotating shafts often include a cylindrical part received around the shaft and a larger bracket used to mount the bracket to a vehicle. Because the shaft may be part of an assembly that may prevent later assembly of the bracket to the shaft, the brackets are assembled to the shaft during processing of the shaft and shipping of the shaft. The larger brackets consume space in workstations and during shipping, which increases the cost to manufacture, assembly and ship the shafts.

SUMMARY

In at least some implementations, a bracket for a rotating shaft includes a base and a retainer. The base has a mount body and a receiver having a first portion coupled to the mount body, a second portion extending from the first portion at a first end of the second portion to a second end of the second portion, a seat and an opening. The opening is defined at least in part by an inner surface disposed around a center axis. The retainer has a first surface engaged with the seat and a second surface engaged with a retention surface of the mount body and the retainer prevents separation of the seat from the retention surface by a distance greater than the distance between the first surface and the second surface.

In at least some implementations, the retainer is movable relative to the receiver and, when the retainer is not engaged with the seat, the distance between the seat and the retention surface is greater than the distance between the first surface and the second surface. In at least some implementations, the receiver is flexible and resilient and applies a tensile force on the retainer when the retainer is coupled to the base.

In at least some implementations, the retainer has an opening that defines an inner surface, and the first surface and the second surface are different portions of the inner surface. In at least some implementations, the seat is defined in a concave portion of the receiver and the retainer overlies the receiver only in the concave portion.

In at least some implementations, the receiver includes an outer surface on an opposite side of the receiver as the inner surface, and the receiver includes a flange that extends from the second end of the second portion to a free end, the flange includes the seat, and wherein the outer surface extends from the second portion to the flange and the seat is part of the outer surface. In at least some implementations, there is a gap between the second end of the second portion and the first portion such that the inner surface is not circumferentially continuous.

In at least some implementations, the flange includes an outer portion that includes the free end and an inner portion, the inner portion is closer to the center axis than the outer portion, and the seat is defined in the inner portion. In at least some implementations, the flange includes a bend between the outer portion and the inner portion so that an area of the flange including the seat is concave. In at least some implementations, the flange overlies the mount body and the outer portion is spaced farther from the mount body than is the inner portion.

In at least some implementations, a shaft assembly includes a shaft arranged for rotation about an axis, a bearing coupled to the shaft, an isolator coupled to the bearing, and a bracket coupled to the isolator. The bracket includes a base having a mount body and a receiver, and a retainer. The receiver has a first portion coupled to the mount body, a second portion extending from the first portion to a free end, a seat and an inner surface disposed about a center axis, with the inner surface engaged with the isolator. The retainer has a first surface engaged with the seat and a second surface engaged with a retention surface of the mount body and wherein the retainer prevents separation of the seat from the retention surface by a distance greater than the distance between the first surface and the second surface.

In at least some implementations, the retainer is releasably coupled to the receiver and, when the retainer is not coupled to the receiver, the distance between the seat and the retention surface is greater than the distance between the first surface and the second surface. In at least some implementations, the retainer has an opening that defines an inner surface, and the first surface and the second surface are oppositely facing portions of the inner surface.

In at least some implementations, the receiver is flexible and resilient and applies a tensile force on the retainer when the retainer is coupled to the base. In at least some implementations, the receiver applies a compressive force to the isolator.

In at least some implementations, the receiver includes an outer surface on an opposite side of the receiver as the inner surface, and the receiver includes a flange that extends from the second end of the second portion to a free end, the flange includes the seat, and wherein the outer surface extends from the second portion to the flange and the seat is part of the outer surface. In at least some implementations, the flange includes an outer portion that includes the free end and an inner portion, the inner portion is closer to the center axis than the outer portion, and the seat is defined in the inner portion, and the seat is in a concave portion of the flange. In at least some implementations, the flange overlies the mount body and the outer portion is spaced farther from the mount body than is the inner portion. In at least some implementations, there is a gap between the second end of the second portion and the first portion such that the inner surface is not circumferentially continuous.

In at least some implementations, the gap in the receiver enables an effective size or inner diameter of the receiver to be increased so that a component, which may be an isolator for a bearing in some applications, may be received in an opening of the receiver. And then the effective size of the receiver may be decreased to firmly hold the receiver against the component (e.g. isolator), and the retainer may be coupled to the receiver to limit the size of the receiver and maintain the receiver tight against the component. The retainer may include an opening through which part of the bracket mount body and the receiver are received, with the retainer trapping part of the receiver relative to the mount body.

BRIEF DESCRIPTION OF THE DRAWINGS

The following detailed description of preferred embodiments and best mode will be set forth with reference to the accompanying drawings, in which.

DETAILED DESCRIPTION

Figure 1:
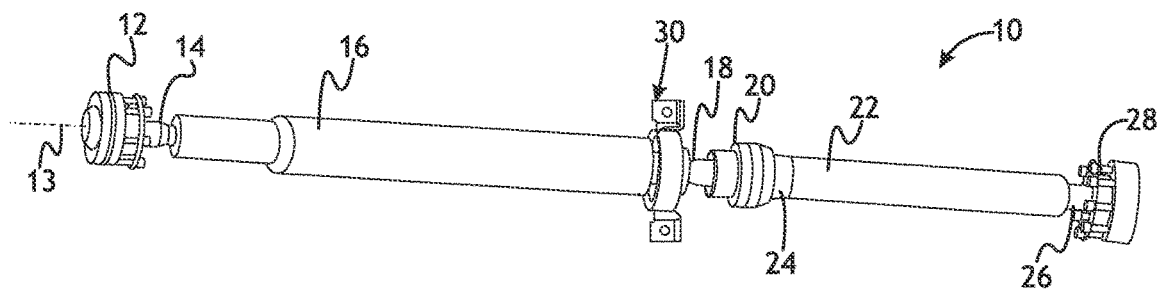
FIG. 1 is a perspective view of a propshaft assembly including a bracket.

Referring in more detail to the drawings, FIG. 1 illustrates a propshaft assembly 10 that is driven for rotation by a power train of a vehicle and which transfers rotary motion to provide a motive force for the vehicle. The propshaft assembly 10 includes a rotary joint, such as a constant velocity joint (CVJ) 12 arranged to be coupled to a power transmission unit of the vehicle that rotates the propshaft about a center axis 13 (with the understanding that the CVJs permit some pivoting of the shaft parts relative to the axis). The CVJ 12 is coupled to an end 14 of a first tube shaft assembly 16 that rotates with the CVJ 12 and which is coupled at its opposite end 18 to another rotary joint which may be another CVJ 20. A second tube shaft assembly 22 is coupled at one end 24 to the CVJ 20 and at its other end 26 to another rotary joint which may be a further CVJ 28 that is arranged to be coupled to another component, like a rear power transfer unit or differential, via which a vehicle axle or sideshaft(s) are rotated. A bracket 30 is arranged to support the propshaft assembly 10 between the ends of the assembly and the bracket 30 is arranged to be mounted to a structural member of the vehicle.

Figure 2:
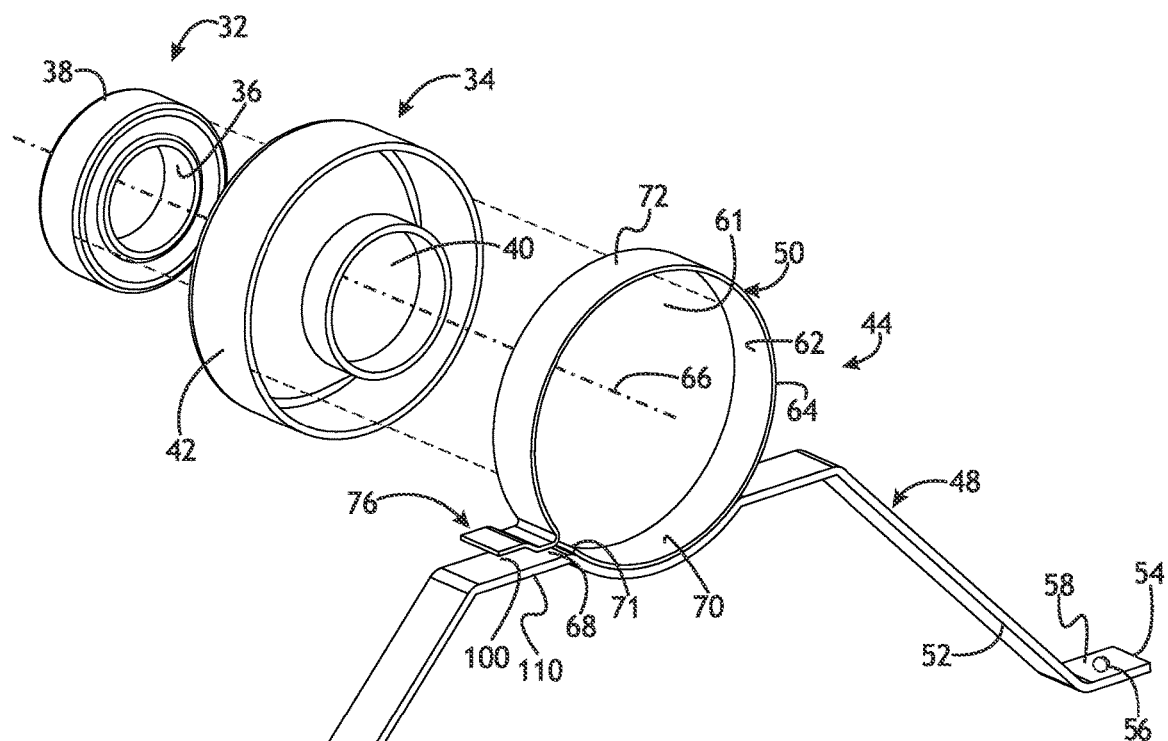
FIG. 2 is a perspective view of a base of the bracket including a receiver coupled to a mount body.

As shown in FIG. 2, to facilitate rotation of the propshaft assembly 10 relative to the bracket 30, a bearing 32 surrounds part of the propshaft assembly 10, shown here as a portion of the first tube shaft assembly 16, and the bearing 32 is coupled to the bracket 30, often with a resilient isolator 34 between the bearing 32 and bracket 30 to damp vibrations and permit limited movement of the propshaft relative to the bracket 30. The bearing 32 may include an inner race 36, an outer race 38 and multiple balls trapped between the races 36, 38 to permit rotation of the inner race 36 relative to the outer race 38. The inner race 36 may be coupled to the first tube shaft assembly 16 for rotation with the first tube shaft assembly. The outer race 38 may be received in an opening 40 of the isolator 34 or otherwise coupled to the isolator 34, and the outer race 38 may be held against rotation so the propshaft and inner race 36 rotate relative to the outer race 38. The isolator 34 has a periphery engaged by and retained by the bracket 30. The isolator 34 may have a circumferentially continuous and circular outer surface 42 and be formed of a suitable polymeric material or composite of materials, and may be elastomeric and resilient, and may be compressed in assembly to retain the isolator 34 relative to the bracket 30, as described further below.

Figure 3:
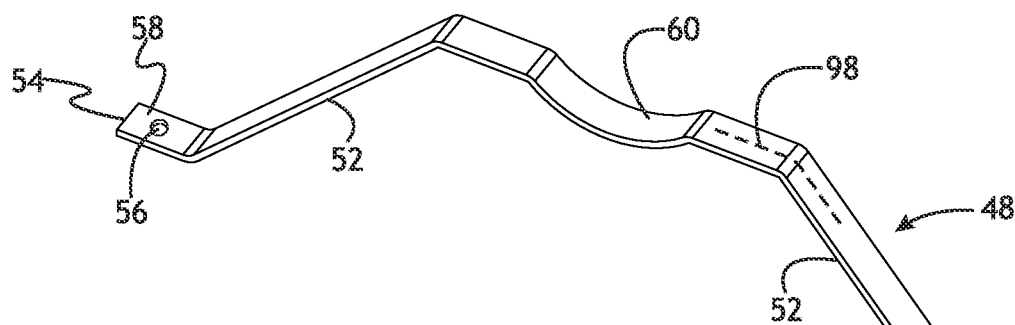
FIG. 3 is a perspective view of the mount body.
Figure 4:
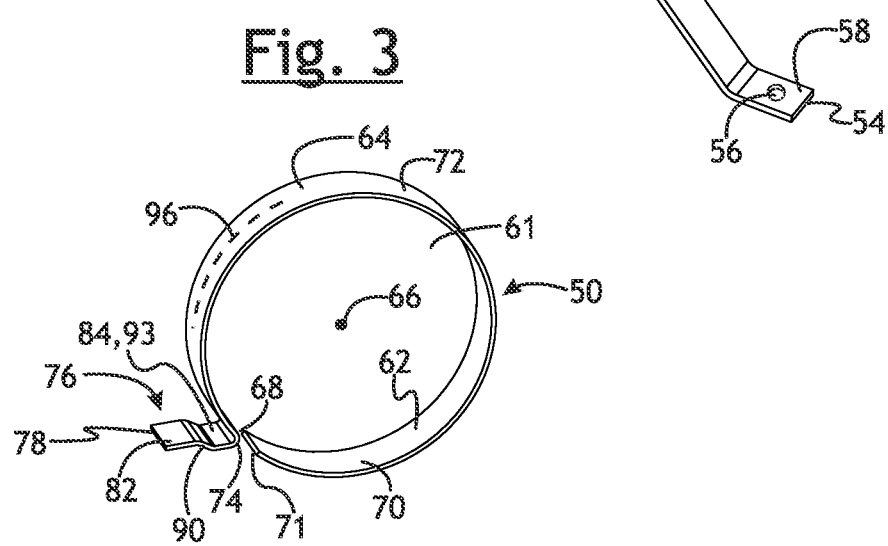
FIG. 4 is a perspective view of the receiver.
Figure 5:
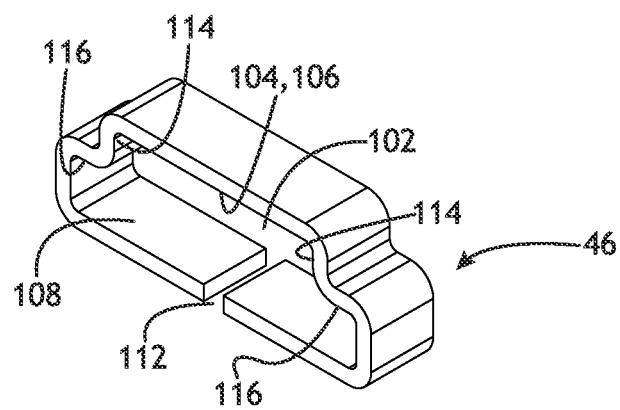
FIG. 5 is a perspective view of a retainer of the bracket.
Figure 6:
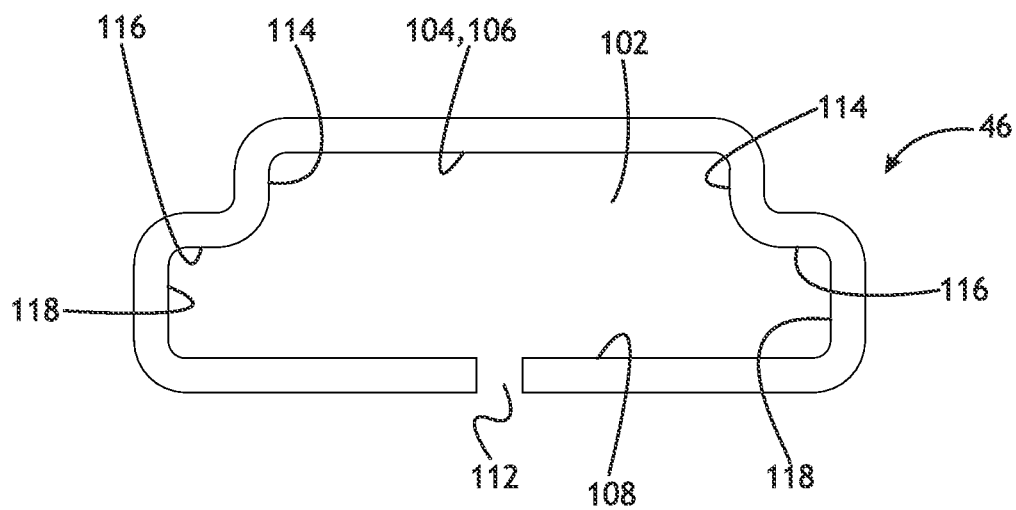
FIG. 6 is a front view of the retainer.

The bracket 30 includes a base 44, shown in FIGS. 2-4, and a retainer 46 shown in FIGS. 5 and 6. In at least some implementations, the base 44 may include a mount body 48 and a receiver 50 carried by the mount body 48. The mount body 48 is arranged to be coupled to the vehicle and, in at least some implementations, has a pair of outwardly extending legs 52 that extend to opposite ends of the mount body 48. The legs 52 may be arranged on opposite sides of the propshaft, with the receiver 50 between ends 54 of the legs 52 and arranged to be received around the propshaft (e.g. the first tube shaft 16 in the example illustrated). Each leg 52 may include a coupling feature by which the mount body 48 is secured to the vehicle. In the example shown, the coupling feature is an opening 56 (FIG. 3) formed in each leg 52, such as in a foot 58 inclined relative to the leg 52 to be parallel to a surface of the vehicle. A bolt may extend through each opening 56 in the mount body 48 to secure the mount body 48 to the vehicle. In at least some implementations, to facilitate connection to the receiver 50, the mount body 48 may include a concave pocket 60 (labeled in FIG. 3) shaped complementarily to a portion of the receiver 50.

The receiver 50 may be a hoop or tube, and includes an opening 61 defining a radially inner surface 62 that is opposite to a radially outer surface 64 of the receiver 50. The receiver 50 may be mostly annular, that is, it may extend more than one hundred and eighty degrees about an axis 66, which in assembly is coaxial with the propshaft axis 13 so that the inner surface 62 overlaps more than half of the circumferential extent of the isolator 34, to retain the isolator 34 relative to the bracket 30. In the example shown, the receiver 50 extends circumferentially more than 300 degrees and includes a gap 68 such that the inner surface 62 is not circumferentially continuous. A first portion 70 of the receiver 50 includes a first end 71 is located in the pocket 60 of the mount body 48 and is secured therein, such as by welding, although other connection methods or connectors may be used instead or in addition to welding, such as a mechanical fastener or adhesive. In this way, the first portion 70 of the receiver 50 is fixed to and does not move relative to the mount body 48. A second portion 72 of the receiver 50 extends arcuately (e.g. circumferentially) from the first portion 70 to a second end 74 that is not coupled to the first portion 70 and which defines at least part of the gap 68. The receiver 50 may include a flange 76 that extends outwardly from the second portion 72 and which defines a free end 78 of the receiver 50 which, in at least some implementations, is not secured to anything (e.g. the flange 76 is cantilevered from the second portion 72). The flange 76 overlies part of the mount body 48 at a location farther from the axis 66 than the inner surface 62 of the first portion 70.

Figure 7:
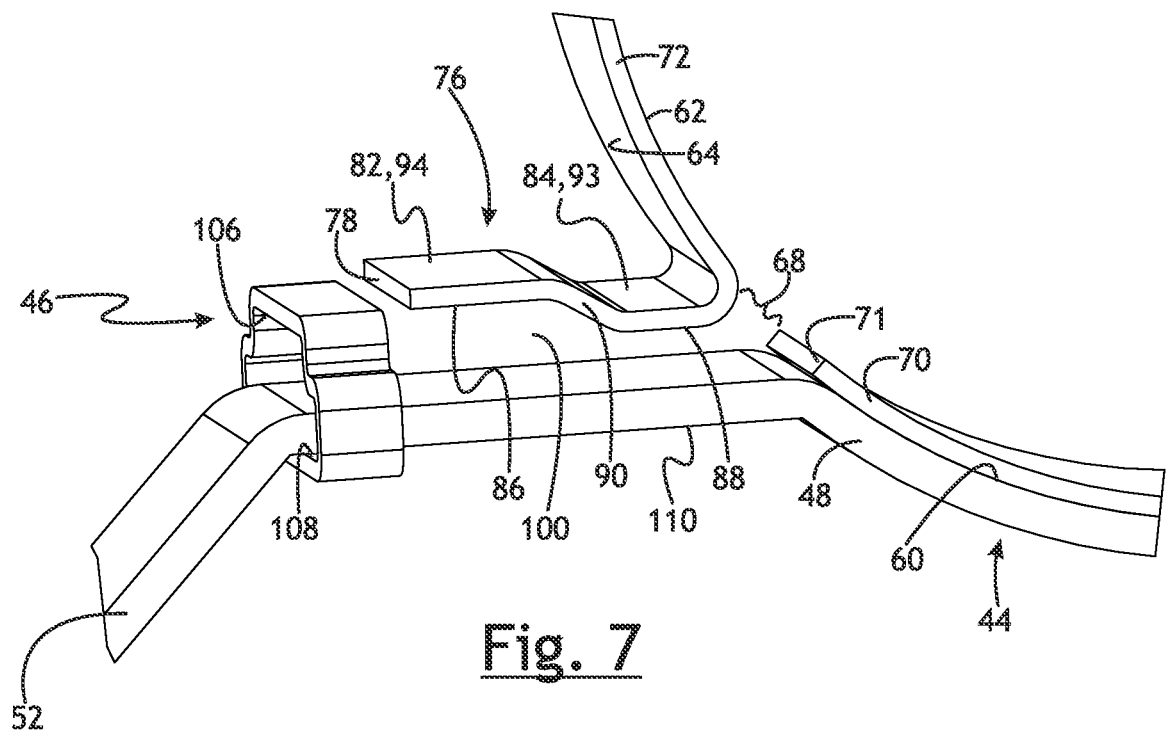
FIG. 7 is an enlarged, fragmentary perspective view of the bracket showing the retainer in a decoupled or pre-assembled position.

The flange 76 may be contoured or shaped as desired. In at least some implementations, such as shown in FIGS. 4 and 7, the flange 76 includes an outer portion 82 that includes the free end 78 and an inner portion 84 that is coupled to the second portion 72 of the receiver 50. At least in an at rest, not flexed position, an inner surface 86 of the outer portion 82 of the flange 76 is spaced farther from the mount body 48 than is the inner surface 88 of the inner portion 84. In the example shown, the flange 76 includes a bend 90 between the outer portion 82 and inner portion 84, and the outer surface of the inner portion 84 defines a concave pocket or seat 93 between 1) the outer surface 94 of the outer portion 82 and 2) the outer surface 64 of the second portion 72 of the receiver 50.

The mount body 48 and receiver 50 may conveniently be formed from metal, such as steel, and may be stamped or otherwise formed, lightweight and relatively inexpensive to produce. The mount body 48 and receiver 50 may be formed separately from each other and connected together after they are formed, to define the base 44 of the bracket 30. An axial width of the receiver 50 (dimension parallel to the axis 66)

may be the same as or different from an axial width of the mount body 48. A centerline 96 (FIG. 4) of the receiver 50 may be aligned with a centerline 98 (FIG. 3) of the mount body 48, if desired. So arranged, the first portion 70 of the receiver 50 is parallel to and is partially and may be completely overlapped by the mount body 48. In at least some implementations, such as that shown in the drawings, the base 44 is wider than the receiver 50, and the receiver 50 is axially centered on the base 44.

As shown in FIGS. 2 and 7, the gap 68 in the receiver 50 is spaced from the first portion 70 and defines an opening 100 between the receiver 50 and the mount body 48, where the opening 100 is defined in part by the flange 76. The opening 100 and gap 68 permit a portion of the receiver 50 to flex and move relative to the first portion 70 and the mount body 48, which changes the effective size of the opening 100 and gap 68, and a diameter of the inner surface 62 of the receiver 50.

In assembly, the opening 100 can be enlarged by resiliently (e.g. elastically) flexing the receiver 50 to permit a portion of the propshaft assembly 10 to pass through the opening 100 so that the propshaft assembly 10 extends through the receiver 50. The inner race 36 of the bearing 32 is assembled to the propshaft (e.g. to the first tube shaft assembly 16 as described above), and the isolator 34 is assembled to the outer race 38 of the bearing 32, and the base 44 of the bracket 30 (i.e. the receiver 50) may be positioned over the outer surface of the isolator 34. To receive the isolator 34, the second portion of the receiver 50 may be flexed to increase the size of the opening 100 and the effective diameter of the inner surface 62, if needed. When received over the outer surface 42 of the isolator 34, the receiver 50 may be permitted to resiliently return to or toward its not flexed position. In at least some implementations, the outer surface 42 of the isolator 34, prior to assembly into the bracket 30, is greater than the effective diameter of the inner surface 62 of the receiver 50 when the receiver 50 is not flexed. In this way, the receiver 50 provides a compressive force on the isolator 34 which tends to prevent relative movement between the isolator 34 and receiver 50.

After the isolator 34 is received in the receiver 50, the retainer 46 can be installed onto the base 44 to inhibit or prevent flexing of the receiver 50 to an extent that would permit decoupling of the receiver 50 from the isolator 34. In at least some implementations, the retainer 46 is adapted to overlie the flange 76 and the mount body 48, to restrict movement of the flange 76 away from the mount body 48 (e.g. in a direction that would enlarge the opening of the receiver 50).

As shown in FIGS. 5 and 6, the retainer 46 has an opening 102 that defines an inner surface 104 having a first surface 106 and an opposite second surface 108. In assembly, the first surface 106 is adapted to overlie the outer surface of the flange 76 (e.g. at the seat 93), and the second surface 108 is adapted to overlie a retention surface 110 (FIGS. 7-9) of the mount body 48 that faces away from the receiver 50 (e.g. the side opposite to the side on which the receiver 50 is coupled). In at least some implementations, the retainer 46 is rigid and does not flex significantly under the forces provided on the receiver 50 and base 44 in use of the propshaft/vehicle, such that the distance between the first surface 106 and second surface 108 remains the same or nearly so in use. That is, any flexing of the retainer 46 is not sufficient to permit decoupling of the isolator 34 from the bracket 30 when the retainer 46 is in a fully installed position as set forth below. The retainer 46 may be formed from a single piece of material and may be circumferentially continuous or it may include a break or gap 112, as shown in FIGS. 5 and 6. In the illustrated embodiment, the retainer 46 is formed from a stamped metal material, such as steel or aluminum, and may be formed to facilitate installation of the retainer 46 to the base 44, and retention of the retainer 46 in use. The retainer 46 could, for example, be formed from a tubular body crimped or otherwise formed as desired, such as by molding, casting or extrusion.

In the example shown, the first surface 106 of the retainer 46 has a width that is larger than the axial width of the flange 76 but not as wide as the portion of the mount body 48 overlapped by the flange 76. The second surface 108 has a width sized to receive the portion of the mount body 48 overlapped by the flange 76, and thus is wider than the first surface 106. So arranged, lateral limit surfaces 114 are defined on opposite sides of the first surface 106, and the lateral limit surfaces 114 are at an angle to the first surface 106 and may be perpendicular thereto. The lateral limit surfaces 114 are arranged to limit lateral movement of the retainer 46 relative to the flange 76, which keeps the retainer 46 aligned with the flange 76 and mount body 48.

Next, a distance between the first surface 106 and second surface 108 may be less than the distance between: 1) the outer surface 94 of the outer portion 82 of the flange 76; and 2) the surface of the mount body leg 52 that is opposite to side of the mount body 48 to which the receiver 50 is coupled, called herein the retention surface 110, when the receiver 50 is not flexed (that is, at rest, with the receiver 50 installed over the isolator 34). The distance between the first surface 106 and second surface 108 may be determined as a function of the desired distance between the inner portion 84 of the flange 76 and the mount body 48 in a final assembled position of the bracket 30, as described in more detail below. That is, the distance between the first surface 106 and second surface 108 may be equal to or less than the distance between the seat 93 and the retention surface 110 before the retainer is installed onto the base. Outboard of the first surface 106 and the lateral limit surfaces 114, one or two outer stop surfaces 116 may be provided, with the illustrated embodiment including two outer stop surfaces 116 that overlap part of the second surface 108. The outer stop surfaces 116 are spaced from the second surface 108 by a distance sufficient to receive a leg 52 of the mounting body 48 therein. That is, this distance is greater than the thickness of the material of the mount body leg 52 over which the retainer 46 is received, as described below. Side walls 118 may enclose this portion of the retainer 46 and prevent the retainer from sliding off of the leg 52 on which it is received.

Figure 8:
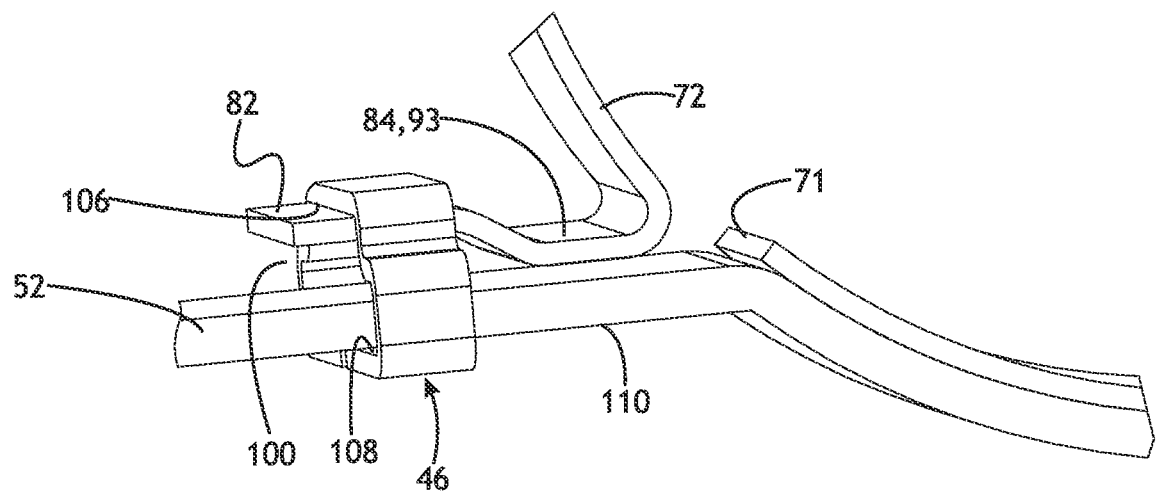
FIG. 8 is an enlarged, fragmentary perspective view of the bracket showing the retainer in an intermediate position.
Figure 9:
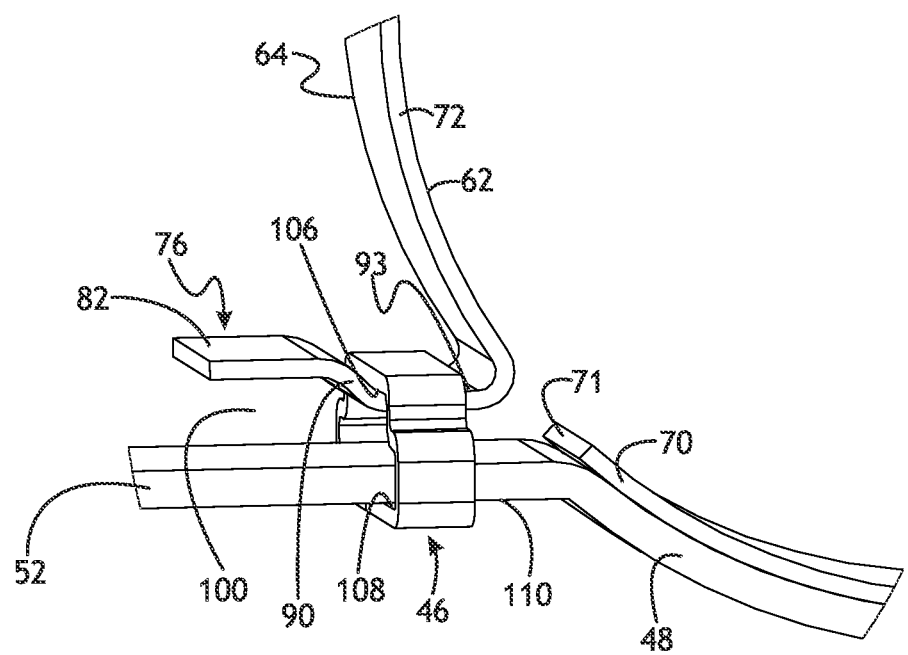
FIG. 9 is an enlarged, fragmentary perspective view of the bracket showing the retainer in a coupled or assembled position.

FIGS. 7-9 illustrate the installation of the retainer 46 to the base 44 of the bracket 30, and show a pre-assembled position (FIG. 7), an intermediate position (FIG. 8) and a final assembled position (FIG. 9). As shown in FIG. 7, prior to connecting the base 44 to the vehicle, a leg 52 of the mount body 48 is inserted into the retainer opening 102, with the first surface 106 oriented on the side of the mount body 48 over which the flange 76 is located. In the implementation shown, and as described above, the distance between the outer portion 82 of the flange 76 and the mount body 48 is such that the flange 76 must be moved closer to the mount body 48 to permit the flange 76 to be received within the opening 102 of the retainer 46, as shown in FIG. 8. When the retainer 46 is received over the outer portion 82 of the flange 76, the isolator 34 is resiliently compressed or further resiliently compressed within the receiver 50. In the final assembled position of the retainer 46, shown in FIG. 9, the retainer 46 is advanced further over the flange 76 until the retainer 46 overlaps the inner portion 84 of the flange 76 and is received within the seat 93. So arranged, the seat 93 extends between the bend 90 and the second portion 72 of the receiver 50 and is large enough to fully receive a wall of the retainer 46 on which the first surface 106 is defined. The first surface 106 and seat 93 may be flat, if desired.

In at least some implementations, the flange 76 is bent so that the seat 93 is closer to the mount body 48 than is the outer portion 82 of the flange 76. In such a design, some of the compressive force on the isolator 34 is relieved when the retainer 46 moves away from the outer portion 82 and into the seat 93, allowing the flange 76 to move away from the mount body 48 under the resilient force provided by the receiver 50 and/or the isolator 34. This resilient force provides a tensile force on the retainer 46 as the retainer 46 limits movement of the flange 76 away from the mount body 48. This may maintain a desired compressive force on the isolator 34 to inhibit unintended movement of the isolator 34 relative to the bracket 30. Absent a force displacing the flange 76 toward the mount body 48, the tensile force on the retainer 46 prevents the retainer 46 from moving out of the pocket and off the seat 93, as the retainer 46 is trapped between the bend 90 in the flange 76 and the second portion 72 of the receiver 50. That is, a wall of the retainer including the first surface 106 is received between the bend 90 and the outer surface 64 of the receiver 50. To further retain the position of the retainer 46, a friction increasing coating or layer such as an elastomer softer than the material of the retainer, may be provided on the inner surface of the retainer, such as on the first surface 106 and/or second surface 108.

In at least some implementations, the force needed to move the flange 76 toward the mount body 48, and thereby permit the retainer 46 to be received over the outer portion 82 of the flange 76, is low enough such that the task can be accomplished with hand tools, like pliers or similar tool, and power tools (e.g. electric, pneumatic or hydraulic tools) are not needed. To permit the retainer to be installed to an intermediate position, such as that shown in FIG. 8, a tool can be positioned spaced from the free end 78 of the flange 76 to permit initial displacement of the flange 76 and receipt of the retainer 46 over the free end 78. Once the retainer 46 has passed the free end 78, the tool may be released and moved to a position over or near the free end 78 with the retainer between the tool and seat 93 so that the tool is out of the way of further movement of the retainer 46 to its final assembled position on the seat 93. Further, the assembly is completed by simply sliding the retainer 46 into position over the seat 93, and an installer/assembler need not tighten a mechanical fastener to secure the receiver 50 to the mount body 48 and ensure sufficient retention force on the isolator 34. This eliminates the need to ensure such a fastener is fully installed at a set torque value or the like. In the example shown, the retainer 46 can easily be visually determined to be within its final assembled position (e.g. within the pocket) and in that position the desired force on the isolator 34 is assured by the construction and arrangement of the base 44 and retainer 46.

Further, as noted above, the bracket 30 can be installed over the propshaft assembly 10 after the propshaft assembly 10 is assembled and other actions, like painting have occurred. The split receiver 50 enables the receiver 50 to be expanded or opened to receive a portion of the propshaft assembly 10 therethrough which can be done even with larger components (e.g. CVJs) at ends of a shaft 16 onto which the bracket is to be installed. Similarly, the flexible receiver 50 facilitates installation of the bracket 30 over the isolator 34 and bearing 32. In this way, the relatively large bracket 30 need not be installed onto the propshaft until the propshaft is ready for installation on a vehicle. This enables the propshaft assembly 10 to be worked on and shipped without large brackets attached thereto, and can save space in shipping containers and in processing stations, like paint booths or the like. Accordingly, the bracket 30 provides significant practical advantages. Further, as noted, in addition to these advantages, in at least some implementations, the bracket 30 may be formed from stamped metal materials and may be lighter weight and less expensive than larger cast metal brackets that have been used. Still further, cast brackets include fixed dimension openings and relied upon a press-fit to retain the isolator 34 in the bracket 30 and installation of the isolator 34 into such fixed openings could be more difficult and/or require more force than with the open/flexible hoop design of the bracket 30 described here. Further, the fixed and enclosed openings required the shaft to be inserted into the bracket before CVJs or other larger components were connected to the shaft.

The forms of the invention herein disclosed constitute presently preferred embodiments and many other forms and embodiments are possible. It is not intended herein to mention all the possible equivalent forms or ramifications of the invention. For example, without limitation, the description above is primarily directed to a propshaft assembly but the bracket may be used to mount other rotating shafts to a structure, as desired. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A bracket for a rotating shaft, comprising:
   a base having a mount body and a receiver, the receiver having a first portion coupled to the mount body and a second portion extending from the first portion at a first end of the second portion to a second end of the second portion, the receiver having a seat and an opening, the opening is defined at least in part by an inner surface disposed around a center axis; and
   a retainer having a first surface engaged with the seat and a second surface engaged with a retention surface of the mount body and wherein the retainer prevents separation of the seat from the retention surface by a distance greater than the distance between the first surface and the second surface, wherein the retainer has an opening that defines an inner surface, and the first surface and the second surface are different portions of the inner surface.

2. The bracket of claim 1 wherein the retainer is movable relative to the receiver and, when the retainer is not engaged with the seat, the distance between the seat and the retention surface is greater than the distance between the first surface and the second surface.

3. The bracket of claim 2 wherein the receiver is flexible and resilient and applies a tensile force on the retainer when the retainer is coupled to the base.

4. The bracket of claim 3 wherein the seat is defined in a concave portion of the receiver and the retainer overlies the receiver only in the concave portion.

5. The bracket of claim 1 wherein an opening is defined between the inner surface of the receiver and an adjacent surface of the mount body, the adjacent surface is on an opposite side of the mount body from the retention surface, and the retainer is located outboard of the opening between the inner surface of the receiver and the adjacent surface of the mount body.

6. The bracket of claim 5 wherein the receiver includes a flange that extends from a second end of the second portion to the free end, and a gap is defined between a second end of the second portion and the first portion, and the opening between the inner surface of the receiver and an adjacent surface of the mount body is defined at least in part by the flange and the gap.

7. The bracket of claim 1 wherein the receiver includes an outer surface on an opposite side of the receiver as the inner surface, and the receiver includes a flange that extends from the second end of the second portion to a free end, the flange includes the seat, and wherein the outer surface extends from the second portion to the flange and the seat is part of the outer surface.

8. The bracket of claim 7 wherein the flange includes an outer portion that includes the free end and an inner portion, the inner portion is closer to the center axis than the outer portion, and the seat is defined in the inner portion.

9. The bracket of claim 8 wherein the flange includes a bend between the outer portion and the inner portion so that an area of the flange including the seat is concave.

10. The bracket of claim 9 wherein the flange overlies the mount body and the outer portion is spaced farther from the mount body than is the inner portion.

11. The bracket of claim 7 wherein there is a gap between the second end of the second portion and the first portion such that the inner surface is not circumferentially continuous.

12. The bracket of claim 1 wherein the first portion of the receiver is secured to the mount body separately from the retainer.

13. A shaft assembly, comprising:
a shaft arranged for rotation about an axis;
a bearing coupled to the shaft;
an isolator coupled to the bearing; and
a bracket coupled to the isolator, the bracket including:
a base having a mount body and a receiver, that receiver having a first portion coupled to the mount body and a second portion extending from the first portion to a free end, the receiver having a seat and an inner surface disposed about a center axis, with the inner surface engaged with the isolator; and
a retainer having a first surface engaged with the seat and a second surface engaged with a retention surface of the mount body and wherein the retainer prevents separation of the seat from the retention surface by a distance greater than the distance between the first surface and the second surface, wherein the retainer engages the receiver only at an outer surface of the receiver, where the outer surface is opposite to the inner surface.

14. The shaft assembly of claim 13 wherein the retainer is releasably coupled to the receiver and, when the retainer is not coupled to the receiver, the distance between the seat and the retention surface is greater than the distance between the first surface and the second surface.

15. The shaft assembly of claim 13 wherein the receiver is flexible and resilient and applies a tensile force on the retainer when the retainer is coupled to the base.

16. The shaft assembly of claim 13 wherein the receiver applies a compressive force to the isolator.

17. The shaft assembly of claim 13 wherein the retainer has an opening that defines an inner surface, and the first surface and the second surface are oppositely facing portions of the inner surface.

18. The shaft assembly of claim 13 wherein the receiver includes an outer surface on an opposite side of the receiver as the inner surface, and the receiver includes a flange that extends from a second end of the second portion to the free end, the flange includes the seat, and wherein the outer surface extends from the second portion to the flange and the seat is part of the outer surface.

19. The bracketshaft assembly of claim 18 wherein the flange includes an outer portion that includes the free end and an inner portion, the inner portion is closer to the center axis than the outer portion, and the seat is defined in the inner portion, and the seat is in a concave portion of the flange.

20. The shaft assembly of claim 19 wherein the flange overlies the mount body and the outer portion is spaced farther from the mount body than is the inner portion.

21. The shaft assembly of claim 18 wherein there is a gap between the second end of the second portion and the first portion such that the inner surface is not circumferentially continuous.

22. The shaft assembly of claim 13 wherein the seat is defined in a concave portion of the receiver and the retainer overlies the receiver only in the concave portion.

23. The shaft assembly of claim 13 wherein the retainer is spaced from and does not engage the isolator.

24. The shaft assembly of 13 wherein the first portion is fixed to the mount body separately from the retainer.

* * * * *